United States Patent
Brownell et al.

(10) Patent No.: US 8,806,655 B1
(45) Date of Patent: Aug. 12, 2014

(54) PROVIDING LIMITED VERSIONS OF APPLICATIONS

(75) Inventors: David M. Brownell, Renton, WA (US); Gerard J. Heinz, II, Seattle, WA (US); Patrick G. McCuller, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 189 days.

(21) Appl. No.: 13/288,320

(22) Filed: Nov. 3, 2011

(51) Int. Cl.
*G06F 7/04* (2006.01)

(52) U.S. Cl.
USPC ............. 726/27; 717/104; 717/178; 713/167; 709/214; 709/248; 707/707; 707/723; 707/731; 705/26.1

(58) Field of Classification Search
USPC .................... 726/27; 717/104, 178; 713/167; 709/214, 248; 707/707, 723, 731; 705/26.1
See application file for complete search history.

(56) References Cited

U.S. PATENT DOCUMENTS

| | | | |
|---|---|---|---|
| 7,519,814 B2 * | 4/2009 | Rochette et al. | 713/167 |
| 2008/0133414 A1 * | 6/2008 | Qin et al. | 705/50 |
| 2011/0066999 A1 * | 3/2011 | Rabinovich et al. | 717/104 |

* cited by examiner

*Primary Examiner* — Thanhnga B Truong
(74) *Attorney, Agent, or Firm* — Thomas | Horstemeyer, LLP

(57) ABSTRACT

Disclosed are various embodiments for providing limited versions of applications. A limited version of an application is automatically generated from a full version of the application based at least in part on an expected use of the application by a client computing device during a testing period. The limited version has a smaller data size than the full version. The limited version of the application is sent to the client computing device. The limited version of the application is configured to be executed in a secured environment of the client computing device. The secured environment denies the limited version of the application access to secured resources of the client computing device.

24 Claims, 5 Drawing Sheets

PROVIDING LIMITED VERSIONS OF APPLICATIONS

BACKGROUND

Software download via the Internet is quickly replacing traditional brick-and-mortar avenues for software distribution. Broadband Internet access allows a customer to download software that would otherwise be distributed through multiple compact discs (CDs) or digital versatile discs (DVDs). Such downloads may be more convenient than a trip to a retail store. Depending on the program size and connection speed, a program may be downloaded, for example, in seconds, minutes, or hours.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to providing limited versions of applications for trial and testing purposes. Mobile computing devices and/or other types of computing devices may have limited connection bandwidth. While Wi-Fi speeds may be acceptable for downloading full versions of applications, it may be that third generation (3G) or fourth generation (4G) bitrates are not. This is especially pertinent in the context of application trials. A user may be seeking to evaluate an application for purchase, but may not have the attention span to be willing to wait minutes for the application package to download. Also, users may be reluctant to install trial software on their computing devices due to security concerns.

Various embodiments of the present disclosure facilitate the generation of limited versions of applications for trial and testing purposes. The limited versions of applications may be distributed by progressive download and/or intelligent download to create a near-instantaneous testing experience for users upon commencing the download process. Furthermore, a secured environment, or "sandbox," may be provided in the device of the user to control access of the application to device resources. Digital rights management (DRM) functionality may be integrated into this environment to secure the downloaded code from unauthorized use. In the following discussion, a general description of the system and its components is provided, followed by a discussion of the operation of the same.

Figure 1:
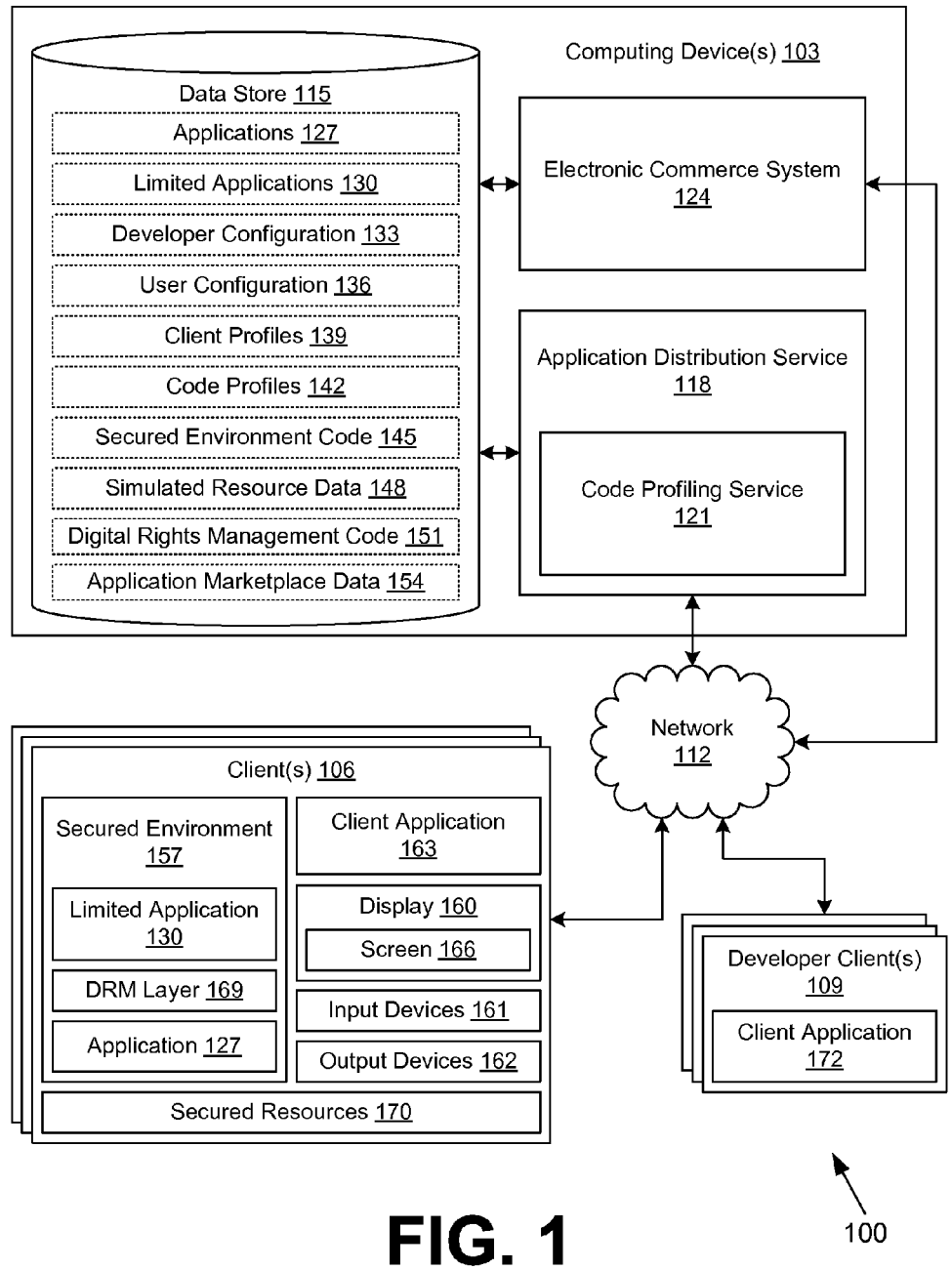
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more clients 106 and one or more developer clients 109 by way of a network 112. The network 112 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 115 that is accessible to the computing device 103. The data store 115 may be representative of a plurality of data stores 115 as can be appreciated. The data stored in the data store 115, for example, is associated with the operation of the various applications and/or functional entities described below.

The components executed on the computing device 103, for example, include an application distribution service 118, a code profiling service 121, an electronic commerce system 124, and other applications, services, processes, systems, engines, or functionality not discussed in detail herein. The application distribution service 118 is configured to generate and distribute limited versions of applications to clients 106. In addition to limited versions, the application distribution service 118 may offer full versions of the applications for download. For example, the application distribution service 118 may offer applications for sale through an application marketplace, including multiple applications from multiple developers. The limited versions of the applications may be configured for execution within a secured environment of the client 106 that prevents unauthorized use of the limited version of the application and also prevents access by the limited version of the application to secured resources of the client 106.

A code profiling service 121 may be employed by the application distribution service 118 to determine portions of the application that may be excluded from the limited version. Additionally, the application distribution service 118 may employ code profiles generated by the code profiling service 121 to reorder the code in the limited version of the application. This reordering is performed to enable intelligent downloading, wherein data is sent according to a predicted sequence of use or execution. Further, the data sent to the client 106 may be configured for a progressive download so that the limited version of the application may be executed while it is still being downloaded.

The electronic commerce system 124 is executed in order to facilitate the online purchase of items such as applications over the network 112. The electronic commerce system 124 also performs various backend functions associated with the online presence of a merchant in order to facilitate the online purchase of items. For example, the electronic commerce system 124 may generate network pages or portions thereof that are provided to clients 106 for the purposes of selecting items for purchase, rental, download, lease, or other forms of consumption.

The data stored in the data store 115 includes, for example, applications 127, limited applications 130, developer configuration 133, user configuration 136, client profiles 139, code profiles 142, secured environment code 145, simulated resource data 148, digital rights management code 151, application marketplace data 154, and potentially other data. The applications 127 correspond to full versions of applications that have been uploaded by developers to be offered in an application marketplace. The applications 127 may correspond, for example, to games or other types of applications. As non-limiting examples, the application 127 may correspond to a high twitch-action game, a first-person shooter game, an action game, an adventure game, a party game, a role-playing game, a simulation game, a strategy game, a vehicle simulation game, and/or other types of games.

The applications 127 may also correspond to mobile phone applications, computer-aided design (CAD) applications, computer-aided manufacturing (CAM) applications, photo manipulation applications, video editing applications, office productivity applications, operating systems and associated applications, emulators for operating systems, architectures, and capabilities not present on a consumer device, and other applications and combinations of applications. The application 127 may be configured for execution in a general-purpose computing device or in a specialized device such as, for example, a smartphone, a video game console, a handheld game device, an arcade game device, etc. In various embodiments, the applications 127 may include support for multiple operating systems, code libraries, client computing devices, etc. which may be unnecessary depending on the client 106 on which the applications 127 are executed.

The limited applications 130 correspond to limited versions of the applications 127 which have been automatically generated by the application distribution service 118. The limited applications 130 may have a smaller data size than the applications 127 and may exclude data and functionality which is unnecessary for evaluation use. For example, data in the corresponding application 127 which is not used during the execution of the limited application 130 may be excluded from the limited application 130. Also, portions of the application 127 may be excluded from the limited application 130 if it is unlikely or impossible for them to be accessed or executed during a time-limited trial.

The developer configuration 133 includes parameters specified by a developer regarding its application 127. For example, the developer configuration 133 may identify portions of the application 127 which may be excluded from the limited application 130, features which are disabled in the limited application 130, which portions of the application 127 are to be downloaded first to "bootstrap" execution, resources of the clients 106 that are used by the application 127, resources of the clients 106 that should be simulated for use by the limited application 130, resources of the client 106 which are to be protected from use by the limited applications 130, resource of the client 106 to which the limited applications 130 are allowed access, time limits for evaluation use of the limited application 130, restrictions on distribution of the limited application 130 and the application 127, license terms, prices for the application 127 in the application marketplace, and so on.

The user configuration 136 includes parameters specified by, or inferred about, users or customers of the application marketplace. For example, the user configuration 136 may describe an operating system and/or other configuration characteristics of the client 106 of the user, resources of the client 106 that should be simulated for use by the limited application 130, resources of the client 106 which are to be protected from use by the limited applications 130, resources of the client 106 to which the limited applications 130 are allowed access, and so on. The user configuration 136 may also include account information, payment instruments, addresses, contact information, and other information used by the electronic commerce system 124.

The client profiles 139 include data describing requirements of particular configurations of clients 106. As a non-limiting example, the client profiles 139 may include data noting dependencies of libraries, etc. for specific operating systems or configurations. The client profiles 139 may also indicate data, code, etc. which is not used for specific operating systems or configurations. Such information may be leveraged by the application distribution service 118 to exclude certain portions of the applications 127 from the limited application 130 when the portions are not actually needed for the specific configuration of a client 106.

The code profiles 142 may correspond to data generated by the code profiling service 121 for a limited application 130 or an application 127. The code profiles 142 may identify sequences of code or data access for the limited application 130 or application 127. The code profiles 142 may also indicate portions of the limited application 130 or application 127 which may possibly be reached within a given time period.

The secured environment code 145 corresponds to code that is configured to implement a secured environment 157 in a client 106. The secured environment 157 is configured to secure one or more resources of the client 106 from access by the limited application 130. The secured environment 157 may also be configured to prevent unauthorized use or copying of the limited application 130 and/or application 127 in the client 106. The secured environment code 145 may include, for example, a virtual machine or other execution wrapper. The simulated resource data 148 comprises data that may be employed by the secured environment code 145 to simulate a secured resource of the client 106 for a limited application 130. As a non-limiting example, where a list of contacts is a secured resource, the simulated resource data 148 may include a dummy list of contacts.

The digital rights management code 151 may be used in conjunction with the secured environment code 145 to prevent unauthorized use or copying of the limited application 130 and/or application 127 in the client 106. The application marketplace data 154 includes varied forms of data used in connection with an application marketplace that offers multiple applications 127 from multiple developers. To this end, the application marketplace data 154 may include network page data, code, images, text, audio, video, etc. relating to merchandising the applications 127 and offering evaluations of the applications 127 through the use of the limited applications 130.

The client 106 is representative of a plurality of client devices that may be coupled to the network 112. The client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 106 may include a display 160. The display 160 may comprise, for example, one or more devices such as cathode ray tubes (CRTs), liquid crystal display (LCD) screens, gas plasma-based flat panel displays, LCD projectors, touchscreens, or other types of display devices, etc. The client 106 may include other input devices 161 and output devices 162. The input devices 161 may comprise, for example, devices such as keyboards, mice, joysticks, accelerometers, light guns, game controllers, touch pads, touch sticks, push buttons, optical sensors, microphones, webcams, and/or any other devices that can provide user input. The output devices 162 may correspond to light indicators, haptic devices, force feedback devices, vibration devices, sound devices, and/or other devices.

The client 106 may be configured to execute various applications such as a client application 163, a secured environment 157, and/or other applications. The client 106 may be configured to execute applications beyond the client application 163 and the secured environment 157 such as, for example, mobile applications, email applications, instant message applications, and/or other applications. The client application 163 may correspond, for example, to a browser or mobile application that accesses and renders network pages, such as web pages, or other network content served up by the computing device 103 and/or other servers, thereby generating a screen 166 on the display 160.

The secured environment 157 corresponds to secured environment code 145 that is configured to download and execute limited applications 130. The secured environment 157 may incorporate a digital rights management (DRM) layer 169 that enforces trial period length restrictions, copying restrictions, and/or other types of DRM restrictions. The secured environment 157 may be further configured to download the application 127 corresponding to the limited application 130 while the limited application 130 is in use or at another time. In one embodiment, the secured environment 157 may be configured merely to download data used to transform the limited application 130 into the full application 127. The secured environment 157 may be configured to protect various secured resources 170 of the client 106 from access by the limited application 130. Such secured resources 170 may include, for example, contacts, email access, text message access, access to input devices 161, access to output devices 162, and so on.

The developer client 109 is representative of a plurality of client devices that may be coupled to the network 112. The developer client 109 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The developer client 109 may include a display comprising, for example, one or more devices such as cathode ray tubes (CRTs), liquid crystal display (LCD) screens, gas plasma-based flat panel displays, LCD projectors, touchscreens, or other types of display devices, etc.

The developer client 109 may be configured to execute various applications such as a client application 172 and/or other applications. The developer client 109 may be configured to execute applications beyond the client application 172 such as, for example, mobile applications, email applications, instant message applications, and/or other applications. The client application 172 may correspond, for example, to a browser or mobile application that accesses and renders network pages, such as web pages, or other network content served up by the computing device 103 and/or other servers. The client application 172 may be employed, for example, by a developer to upload applications 127 and developer configurations 133 to the computing device 103.

Next, a general description of the operation of the various components of the networked environment 100 is provided. To begin, a developer at a developer client 109 uploads an application 127 to the application distribution service 118 over the network 112. For example, the developer may access a user interface such as a network page using the client application 172. The developer may enter various configuration settings specifying how much the application 127 should cost in the application marketplace, distribution restrictions, evaluation version restrictions, secured resources 170 of clients 106 to which an evaluation version should not have access, and so on. Such configuration settings may be stored in the developer configuration 133.

The application 127 is added to the application marketplace. The code profiling service 121 may process the application 127 to determine various code profiles 142, e.g., determining which portions of the application 127 are capable of being accessed during time-limited trials, determining a sequence of code access for intelligent downloading, and so on. Users at clients 106 may register for access to the application marketplace and may specify various settings through a user interface of the client application 163, e.g., secured resources 170 of clients 106 to which an evaluation version should not have access, information about clients 106 of the user, etc. Such settings may be stored in the user configuration 136.

The application distribution service 118 automatically generates the limited applications 130 from the applications 127. The limited applications 130, which may be referred to as demonstration versions, are reduced in size compared to the applications 127 and may be generated based at least in part on an expected use of the limited application 130 during a testing period. The limited applications 130 may be customized based on the client 106 to exclude data which is unnecessary for execution in the particular client 106. For example, the limited application 130 may exclude at least one portion of the application 127 which pertains to a different configuration from the configuration of the client 106. The limited application 130 may be generated in response to a user request for the limited application 130 or at some other time.

In some embodiments, the application distribution service 118 may employ an intelligent downloading approach. Under such an approach, the data comprising the limited application 130 may be reordered according to a predicted code execution sequence. Such a predicted code execution sequence may be determined through code profiling of the application 127 or limited application 130 by the code profiling service 121. Upon reordering, the limited application 130 may be sent to the client 106 so that portions that are to be executed first are sent first. Additionally, a progressive downloading approach may be employed so that the limited application 130 may begin executing in the client 106 before the limited application 130 has been received in its entirety.

Secured environment code 145 is also sent to the client 106 and may be applicable for multiple limited applications 130. The secured environment code 145 is executed in the client 106 as a secured environment 157. In various embodiments, the secured environment 157 may incorporate a virtual machine such as a Java Virtual Machine (JVM), a Dalvik Virtual Machine, and so on. The secured environment 157 may be configured to facilitate progressive downloading of the limited application 130 from the application distribution service 118.

Also, the secured environment 157 may be configured to deny access by the limited application 130 to various secured resources 170 of the client 106 as specified, for example, in the user configuration 136, in the developer configuration 133, at runtime by the user, etc. In some situations, the secured environment 157 may be configured to simulate the secured resources 170 using the simulated resource data 148. As a non-limiting example, where a list of contacts corresponds to a secured resource 170, the secured environment 157 may be configured to provide access to a dummy list of contacts for the limited application 130. The specification of such secured resources 170 may be sent from the computing device 103 to the client 106.

The secured environment 157 may include a DRM layer 169 that is configured to prevent unauthorized use of the limited application 130 such as unauthorized copying, running the limited application 130 beyond a predetermined number of times, beyond a cumulative time limit, or beyond a maximum instance running time, etc. In some embodiments, the secured environment 157 may be configured to obtain data relating to the application 127 to make the application 127 instantly available upon purchase. To this end, the secured environment 157 may obtain the application 127 data in the background after the limited application 130 is obtained. The DRM layer 169 may protect the application 127 data from unauthorized use before purchase.

Although it is noted that the limited applications 130 may correspond to demonstration versions of applications 127, the limited applications 130 may also correspond to other types of limited or processed versions of applications 127. For example, a limited application 130 may correspond to a sanitized version of an application 127 that excludes harmful code such as computer viruses, spyware, adware, and/or other malware. Such a sanitized version of the application 127 may also exclude code that has defects (e.g., code that causes memory leaks, infinite loops, etc.). Such malware and defects may be specified by a developer, application marketplace administrator, or another user. Alternatively, the malware and/or defects may be automatically identified by way of code profiling by the code profiling service 121.

In some cases, a sanitized version of an application 127 may be generated based at least in part on a client profile 139. As a non-limiting example, a client 106 may execute a particular version of an operating system with which an application 127 has an incompatibility. The application distribution service 118 may be configured to recognize this incompatibility and to generate a corresponding limited application 130 for the client 106 that excludes or otherwise corrects the code that causes the incompatibility. The application distribution service 118 may also configure the secured environment 157 automatically to prevent access to secured resources 170 relating to an identified problem. In some embodiments, an application 127 may be sanitized to exclude obscene language or other undesirable portions.

Figure 2:
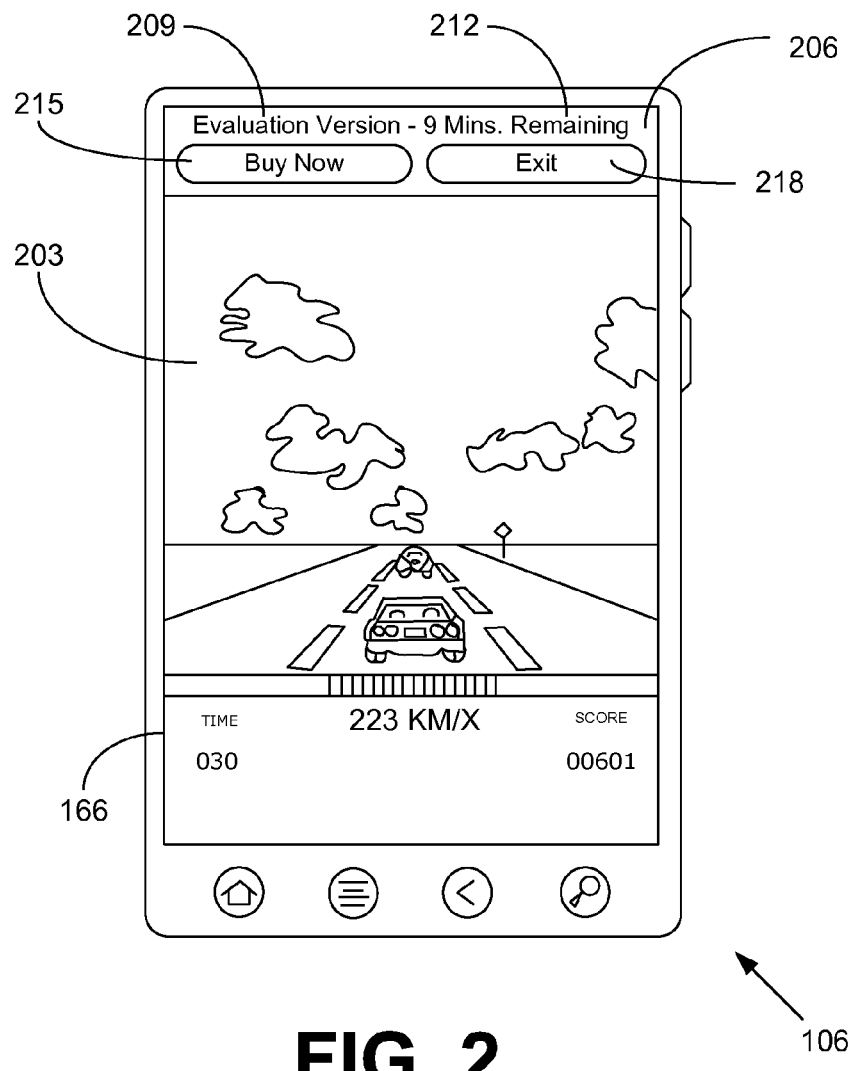
FIG. 2 is a drawing of an example of a client in the networked environment of FIG. 1 according to various embodiments of the present disclosure.

Turning now to FIG. 2, shown is one example of a client 106 in the networked environment 100 (FIG. 1). In this non-limiting example, the client 106 corresponds to a smartphone. The screen 166 of the client 106 shows a first user interface 203 generated by a limited application 130 (FIG. 1) and a second user interface 206 generated by a secured environment 157 (FIG. 1). The first user interface 203 corresponds to a game interface for a limited application 130 that is a racing game. Although the application 127 (FIG. 1) from which the limited application 130 is derived may ordinarily consume the entire screen 166 for the first user interface 203, here, the first user interface 203 shares screen 166 space with the second user interface 206.

In this non-limiting example, the second user interface 206 is a menu bar at the top of the screen 166. The second user interface 206 may correspond to an overlay, a side bar, a box, an interface element that is hidden at times, etc. in other examples. The second user interface 206 may include, for example, a title indicator 209, a status indicator 212, a purchase component 215, an exit component 218, and/or other components. The title indicator 209 may indicate to the user that an evaluation or trial version is being executed, that a secured environment 157 is being used, a name of an application marketplace, and/or other information. The status indicator 212 may indicate various statuses associated with the execution of the limited application 130 such as time remaining, remaining number of times the limited application 130 can be run, whether features are restricted, and so on. Here, the limited application 130 is a time-limited trial, and the status indicator 212 shows that nine minutes remain in the trial.

The purchase component 215 may be linked with the electronic commerce system 124 (FIG. 1) so that, when selected, the purchase component 215 initiates a purchase in the application marketplace of the full application 127 that corresponds to the limited application 130. Alternatively, the purchase component 215 may be configured to bring up a user interface in the client application 163, such as a rendered network page, with more information about ordering the full application 127 through the application marketplace. The exit component 218 may be used to terminate the limited application 130 and exit the secured environment 157. Different components, fewer components, or other components may be present in other examples of the second user interface 206.

Figure 3:
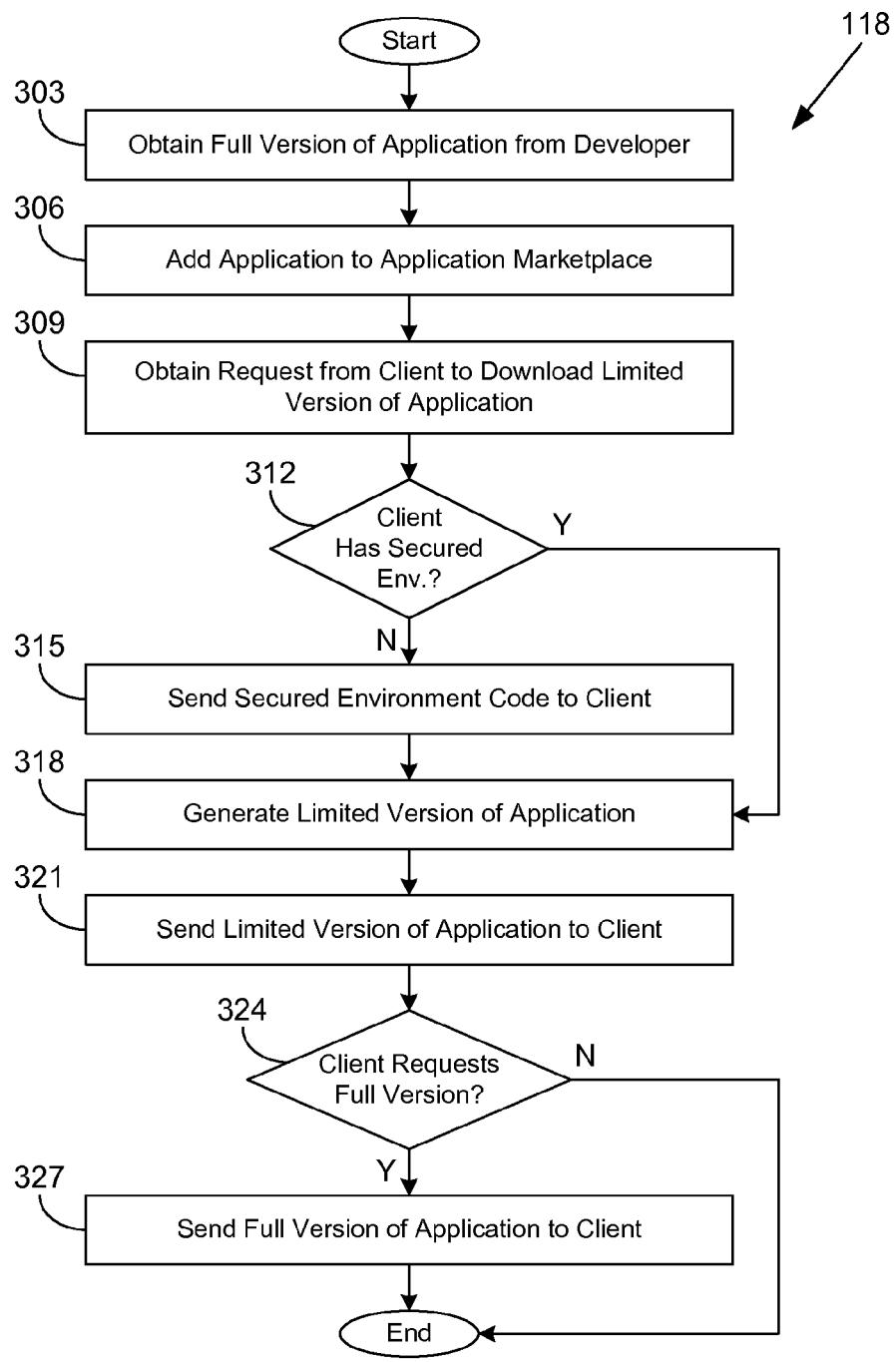
FIG. 3 is a flowchart illustrating one example of functionality implemented as portions of an application distribution service executed in a computing device in the networked environment of FIG. 1 according to various embodiments of the present disclosure.

Moving on to FIG. 3, shown is a flowchart that provides one example of the operation of a portion of the application distribution service 118 according to various embodiments. It is understood that the flowchart of FIG. 3 provides merely an example of the many different types of functional arrangements that may be employed to implement the operation of the portion of the application distribution service 118 as described herein. As an alternative, the flowchart of FIG. 3 may be viewed as depicting an example of steps of a method implemented in the computing device 103 (FIG. 1) according to one or more embodiments.

Beginning with box 303, the application distribution service 118 obtains the application 127 (FIG. 1) by way of the network 112 (FIG. 1) from the developer of the application 127 at the developer client 109 (FIG. 1). The developer may also provide various configuration settings for the developer configuration 133 (FIG. 1). In box 306, the application distribution service 118 adds the application 127 to the application marketplace. In box 309, the application distribution service 118 obtains a request from a client 106 (FIG. 1) to download a limited version of the application 127. For example, the application 127 may be offered as a free, time-limited or feature-limited trial through the application marketplace.

In box 312, the application distribution service 118 determines whether the client 106 has the appropriate secured environment 157 (FIG. 1). If the client 106 does not have the appropriate secured environment 157, then in box 315, the application distribution service 118 sends secured environment code 145 (FIG. 1) to the client 106 over the network 112. In various embodiments, at least a portion of the secured environment code 145 is applicable to execute limited versions of different applications 127 offered in the application marketplace. The secured environment code 145 may be customized according to characteristics of the client 106 such as, for example, device type, operating system, existing software libraries, and so on. The application distribution service 118 continues to box 318. If the application distribution service 118 determines that the client 106 already has a secured environment 157, the application distribution service 118 proceeds from box 312 to box 318.

In box 318, the application distribution service 118 automatically generates a limited application 130 (FIG. 1) from the application 127. The limited application 130 may have a reduced data size compared to the application 127. In some embodiments, the limited application 130 may have previously been generated and stored in the data store 115 (FIG. 1). The limited application 130 may be generated based at least in part on an expected use of the application 127 by the client 106 during a testing period. For example, the limited application 130 may exclude a portion of the application 127 that is predicted to be unaccessed during the testing or evaluation period. Such a portion may remain unaccessed because a time limitation does not allow for a user to reach functionality of the portion, the client 106 does not support the portion, or for other reasons. The code profiles 142 may indicate which portions of the application 127 are predicted to remain unaccessed.

In box 321, the application distribution service 118 sends the limited application 130 to the client 106. The limited application 130 may be sent using an intelligent download approach and/or a progressive download approach so that the secured environment 157 of the client 106 is able to commence execution of the limited application 130 before the limited application 130 has finished downloading. In box 324, the application distribution service 118 determines whether the client 106 has requested the full version of the application 127. For example, the user at the client 106 may select a purchase component 215 (FIG. 2) or other user interface component that corresponds to a request for the full version of the application 127. In some embodiments, the secured environment 157 may be configured to request the full version of the application 127 automatically so long as the download does not diminish the user experience due to bandwidth on the network 112, consumed resources of the client 106, and so on.

If the full version of the application 127 is to be sent, the application distribution service 118 proceeds to box 327 and sends the full version of the application 127 to the client 106. In one embodiment, the sent data corresponds to data for transforming the limited application 130 into the full application 127 or some other subset of data that is less than the entire application 127. The data that is sent may be customized according to the capabilities of the client 106. Thereafter, the portion of the application distribution service 118 ends. If the full version of the application 127 is not to be sent in box 324, the portion of the application distribution service 118 also ends.

Figure 4:
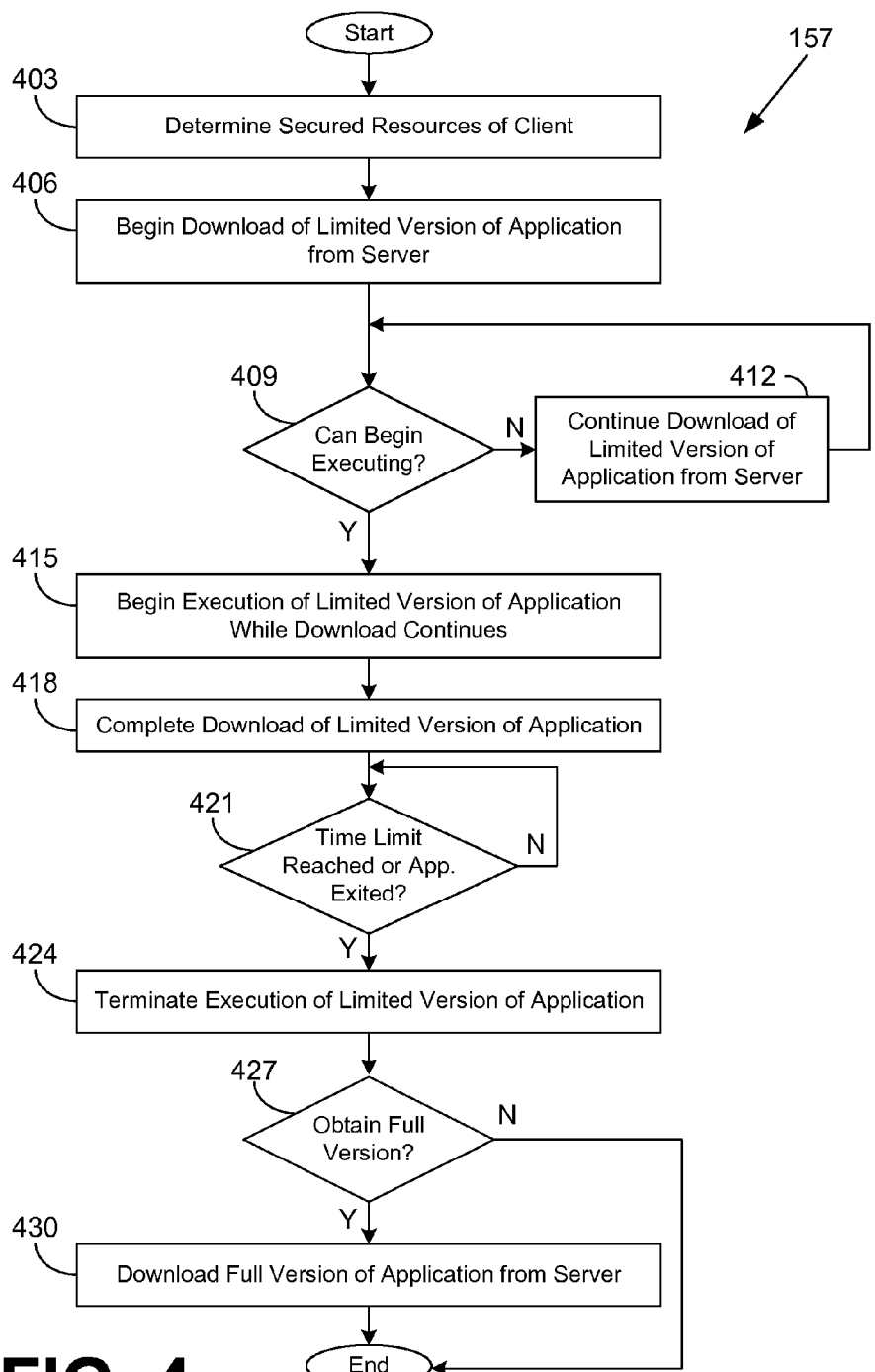
FIG. 4 is a flowchart illustrating one example of functionality implemented as portions of a secured environment executed in a client in the networked environment of FIG. 1 according to various embodiments of the present disclosure.

Referring next to FIG. 4, shown is a flowchart that provides one example of the operation of a portion of the secured environment 157 according to various embodiments. It is understood that the flowchart of FIG. 4 provides merely an example of the many different types of functional arrangements that may be employed to implement the operation of the portion of the secured environment 157 as described herein. As an alternative, the flowchart of FIG. 4 may be viewed as depicting an example of steps of a method implemented in the client 106 (FIG. 1) according to one or more embodiments.

Beginning with box 403, the secured environment 157 determines the secured resources 170 (FIG. 1) of the client 106. For example, the secured environment 157 may provide a user interface that prompts a user to select various resources as secured or non-secured. Such resources may correspond to contact lists, telephone capability, global positioning system (GPS) information, text message capability, email capability, and so on. The secured environment 157 may design various resources as secured by default.

In box 406, the secured environment 157 begins a download of a limited application 130 (FIG. 1) from the application distribution service 118 (FIG. 1). For example, the secured environment 157 may be preconfigured to download the limited application 130 as a result of the user selecting a link in a user interface of the client application 163 (FIG. 1) or otherwise indicating a selection of a limited application 130. The download may be performed, for example, using an intelligent download and/or progressive download approach.

In box 409, the secured environment 157 determines whether the limited application 130 can begin executing. For example, sufficient data may have been received to begin execution of the limited application 130 according to a progressive download approach. If sufficient data has not been received, the secured environment 157 moves to box 412 and continues downloading the limited application 130 from the application distribution service 118. The secured environment 157 then returns to box 409. If the secured environment 157 instead determines in box 409 that sufficient data has been received, the secured environment 157 proceeds to box 415.

In box 415, the secured environment 157 begins execution of the limited application 130, potentially while the download of the limited application 130 continues under a progressive download approach. While the limited application 130 executes, the secured environment 157 may deny access by the limited application 130 to secured resources 170. Alternatively, the secured environment 157 may provide access to simulated versions of the secured resources 170 in the client 106. In box 418, the secured environment 157 completes the download of the limited application 130. In box 421, the secured environment 157 determines if a time limit has been reached, or if the limited application 130 has been exited. If a time limit has not been reached, or if the limited application 130 has not been exited, the secured environment 157 returns to box 421 while the execution of the limited application 130 continues. If a time limit has been reached, or if the limited application 130 has been exited, the secured environment 157 proceeds to box 424.

In box 424, the secured environment 157 terminates execution of the limited application 130. In box 427, the secured environment 157 determines whether the full version of the application 127 (FIG. 1) corresponding to the limited application 130 is to be obtained. If the full version of the application 127 is to be obtained, the secured environment 157 transitions to box 430 and downloads the full version of the application 127 from the application distribution service 118. In some cases, the data obtained for the full version may be merely the data to transform the limited application 130 into the application 127. Such data may be maintained in a secured state by the DRM layer 169 (FIG. 1) until unlocked or purchased. Thereafter, the portion of the secured environment 157 ends. If the full version is not to be obtained in box 327, the portion of the secured environment 157 also ends.

Figure 5:
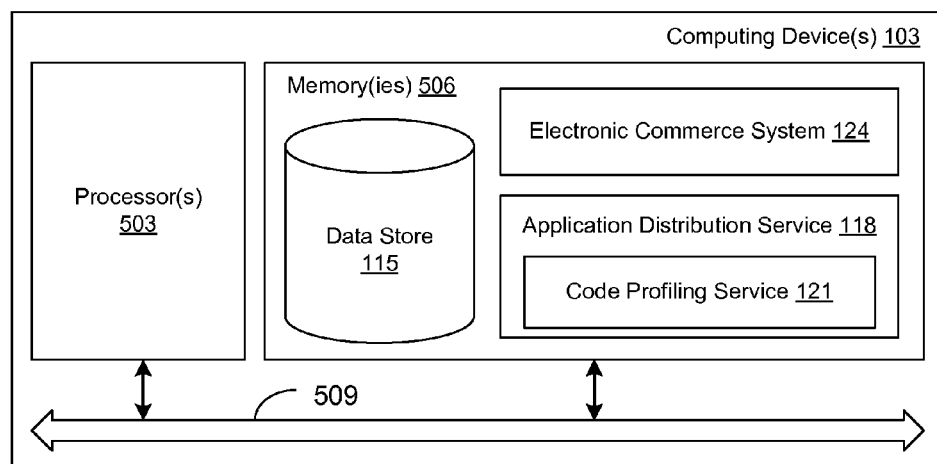
FIG. 5 is a schematic block diagram that provides one example illustration of a computing device employed in the networked environment of FIG. 1 according to various embodiments of the present disclosure.

With reference to FIG. 5, shown is a schematic block diagram of the computing device 103 according to an embodiment of the present disclosure. The computing device 103 includes at least one processor circuit, for example, having a processor 503 and a memory 506, both of which are coupled to a local interface 509. To this end, the computing device 103 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the application distribution service 118, the code profiling service 121, the electronic commerce system 124, and potentially other applications. Also stored in the memory 506 may be a data store 115 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the application distribution service 118, the code profiling service 121, the electronic commerce system 124, the secured environment 157 (FIG. 1), the client application 163 (FIG. 1), the client application 172 (FIG. 1), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3 and 4 show the functionality and operation of an implementation of portions of the application distribution service 118 and the secured environment 157. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 3 and 4 show a specific order of execution, it is understood that the order of execution may differ from that which is depicted. For example, the order of execution of two or more blocks may be scrambled relative to the order shown. Also, two or more blocks shown in succession in FIGS. 3 and 4 may be executed concurrently or with partial concurrence. Further, in some embodiments, one or more of the blocks shown in FIGS. 3 and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the application distribution service 118, the code profiling service 121, the electronic commerce system 124, the secured environment 157, the client application 163, the client application 172, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, the program comprising:
   code that obtains a plurality of applications from a plurality of developers;
   code that offers the applications for sale in an application marketplace;
   code that offers a demonstration version of one of the applications in the application marketplace;
   code that automatically generates the demonstration version of the one of the applications from a full version of the one of the applications, wherein at least one portion of the full version is excluded from the demonstration version based at least in part on a predicted use of the demonstration version, and the demonstration version has a reduced data size compared to the full version;
   code that sends code that implements a secured environment to a client computing device, wherein the secured environment is configured to execute demonstration versions of the applications in the client computing device such that the demonstration versions of the applications are denied access to at least one secured resource of the client computing device;
   code that sends the demonstration version of the one of the applications to the client computing device;
   wherein data corresponding to the demonstration version of the one of the applications is sent according to a sequence established based at least in part on a code access profile for the demonstration version of the one of the applications; and
   wherein the client computing device is configured to commence execution of the demonstration version of the one of the applications while a portion of the demonstration version of the one of the applications remains to be received by the client computing device.

2. The non-transitory computer-readable medium of claim 1, wherein the demonstration version of the one of the applications is automatically generated based at least in part on a configuration associated with the client computing device and in response to a download request obtained from the client computing device.

3. The non-transitory computer-readable medium of claim 1, wherein the code that implements the secured environment is configured to enforce a maximum running time for the demonstration version of the one of the applications in the client computing device.

4. The non-transitory computer-readable medium of claim 1, wherein the client computing device is a mobile computing device.

5. A system, comprising:
   at least one computing device; and
   an application distribution service executable in the at least one computing device, the application distribution service comprising:
      logic that automatically generates a limited version of an application from a full version of the application based at least in part on an expected use of the application by a client computing device during a testing period, the limited version having a smaller data size than the full version; and
      logic that sends the limited version of the application to the client computing device, wherein the limited version of the application is configured to be executed in a secured environment of the client computing device that denies access to at least one secured resource of the client computing device by the limited version of the application.

6. The system of claim 5, wherein the application distribution service further comprises logic that sends simulated resource data to the client computing device, wherein the secured environment is configured to simulate the at least one secured resource for the limited version of the application according to the simulated resource data.

7. The system of claim 5, wherein the application distribution service further comprises logic that sends code that implements the secured environment to the client computing device.

8. The system of claim 5, wherein the secured environment is configured to obtain a user specification of the at least one secured resource to which access by the limited version of the application is to be denied.

9. The system of claim 5, wherein the application distribution service further comprises:
   logic that obtains the full version of the application from a developer of the application; and
   logic that adds the application to an application marketplace that offers a plurality of applications by a plurality of developers.

10. The system of claim 9, wherein the application distribution service further comprises:
    logic that obtains a specification of the at least one secured resource to which access by the limited version of the application is to be denied from the developer; and
    logic that sends the specification of the at least one secured resource to the client computing device.

11. The system of claim 5, wherein the logic that sends the limited version of the application to the client computing device further comprises logic that reorders code corresponding to the limited version of the application based at least in part on a predicted code execution sequence.

12. The system of claim 11, wherein the application distribution service further comprises logic that determines the predicted code execution sequence through code profiling of the application.

13. The system of claim 5, wherein the secured environment is configured to execute the limited version of the application while a portion of the limited version of the application is being downloaded.

14. The system of claim 5, wherein the expected use corresponds to a time-limited trial of the application, and the limited version of the application excludes at least one portion of the full version of the application which is predicted to be unaccessed during the testing period.

15. The system of claim 14, wherein the application distribution service further comprises logic that determines the at least one portion of the full version of the application which is predicted to be unaccessed during the testing period based at least in part on code profiling of the application.

16. The system of claim 5, wherein the expected use corresponds to execution by a first configuration of the client computing device, and the limited version of the application excludes at least one portion of the full version of the application which pertains to a second configuration of the client computing device that is different from the first configuration.

17. The system of claim 5, wherein the expected use corresponds to execution by a configuration of the client computing device, and the limited version of the application excludes at least one portion of the full version of the application which is identified as harmful to the configuration of the client computing device.

18. The system of claim 5, wherein the secured environment includes a digital rights management (DRM) layer that is configured to prevent unauthorized use of the limited version of the application.

19. The system of claim 18, wherein the unauthorized use corresponds to unauthorized copying of the limited version of the application.

20. A method, comprising:
automatically generating, in at least one computing device, a limited version of an application from a full version of the application, wherein the limited version has a reduced data size compared to the full version and excludes a portion of the application that is predicted to be unaccessed during an evaluation period;
reordering, in the at least one computing device, code of the limited version of the application based at least in part on a code access sequence predicted for the limited version of the application; and
sending, in the at least one computing device, the limited version of the application to a client computing device, wherein the limited version of the application is configured to commence execution in the client computing device before the limited version of the application is sent.

21. The method of claim 20, further comprising sending, in the at least one computing device, data for transforming the limited version of the application into the full version of the application after the limited version of the application is sent.

22. The method of claim 20, further comprising sending, in the at least one computing device, code that implements a secured environment to the client computing device, wherein the limited version of the application is configured to be executed in the secured environment, and the secured environment is configured to deny access by the limited version of the application to at least one secured resource of the client computing device.

23. The method of claim 22, wherein the secured environment is configured to enforce a time limit for the evaluation period.

24. The method of claim 22, wherein the secured environment is configured to render a first user interface that includes a second user interface rendered by the limited version of the application and a component for initiating a purchase of the full version of the application.

* * * * *